United States Patent
Hawksworth et al.

(10) Patent No.: US 6,813,042 B2
(45) Date of Patent: Nov. 2, 2004

(54) DIGITAL PREPRESS TRAPPING TOOLS

(75) Inventors: Wayne Hawksworth, Heatherton Village (GB); Robert Myers, Peterborough (GB)

(73) Assignee: Imagelinx International Ltd., Nottinghamshire (GB)

( * ) Notice: Subject to any disclaimer, the term of this patent is extended or adjusted under 35 U.S.C. 154(b) by 168 days.

(21) Appl. No.: 10/315,311

(22) Filed: Dec. 10, 2002

(65) Prior Publication Data

US 2004/0109183 A1 Jun. 10, 2004

(51) Int. Cl.[7] .................................................. H04N 1/58
(52) U.S. Cl. ........................ 358/1.9; 358/3.26; 358/530; 358/540
(58) Field of Search ......................... 358/1.9, 530, 540, 358/3.26, 1.18, 501, 515, 537, 538; 345/619, 629; 715/517, 518, 521

(56) References Cited

U.S. PATENT DOCUMENTS

| 5,196,927 A | 3/1993 | Warner |
| 5,649,220 A | 7/1997 | Yosefi |
| 6,031,544 A | * 2/2000 | Yhann .......................... 345/620 |
| 6,381,032 B1 | 4/2002 | Laverty et al. |
| 6,429,947 B1 | 8/2002 | Laverty et al. |
| 6,483,524 B1 | 11/2002 | Petchenkine et al. |
| 2002/0051156 A1 | 5/2002 | Weinholz et al. |
| 2003/0044065 A1 | 3/2003 | Harrington |

OTHER PUBLICATIONS

Robin B. McAllister, "Trapping", Delmar Publishers, Pathways to print series (1997).*

* cited by examiner

Primary Examiner—Scott Rogers
(74) Attorney, Agent, or Firm—Gardner Carton & Douglas LLP

(57) ABSTRACT

Digital prepress trapping tools are described, including suggestions for how to implement the tools within a native artwork production environment, such as Adobe Illustrator™. The invention allows for the prepress work of applying high quality traps to be accomplished without conversion to a proprietary file format or transfer of data to and from a server. The trapping tools include tools for automatically generating spreads and chokes according to certain user specified criteria, and without destroying the object being trapped.

62 Claims, 14 Drawing Sheets

Overprint of First Color with Second Color

Knockout of First Color

Build Back of Second Color

Knockout with Build Back

Misregistration of Knockout and Build Back

Spread Part

Choke Part

Spread All

Choke All

Spread All (Compound)

Choke All (Compound)

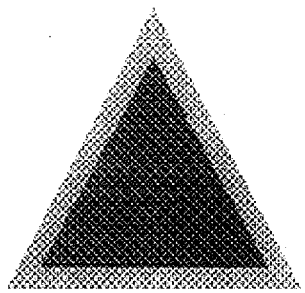
FIG. 4A
Mitred
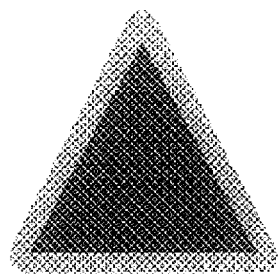
FIG. 4B
Rounded
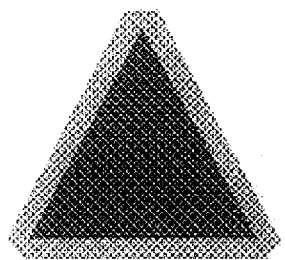
FIG. 4C
Bevelled
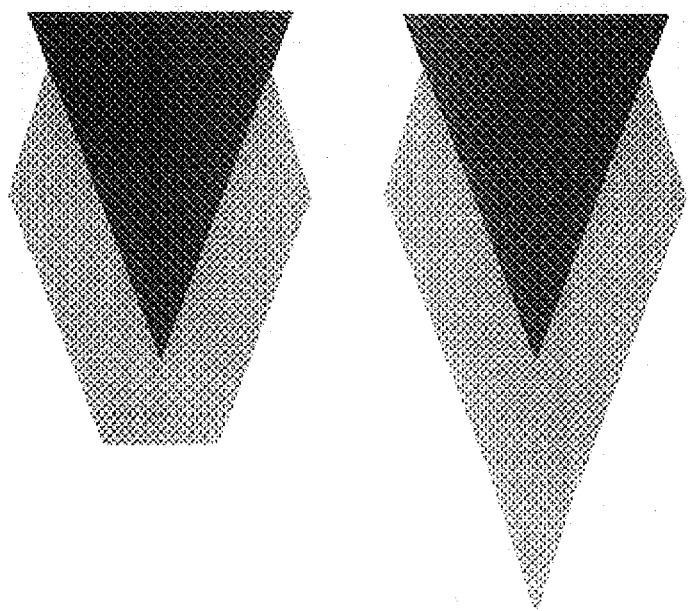
FIG. 5A
Limit > 0
FIG. 5B
Limit = 0

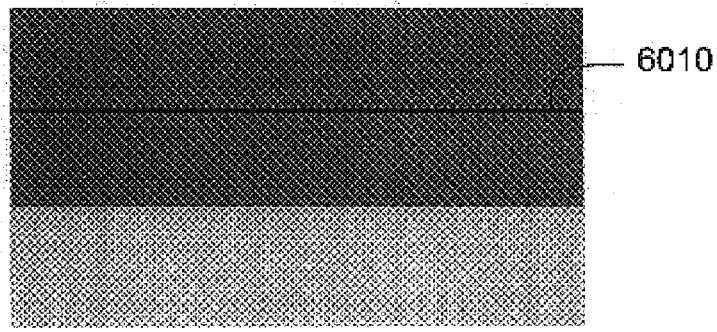
Mitre Angle: None
FIG. 6A
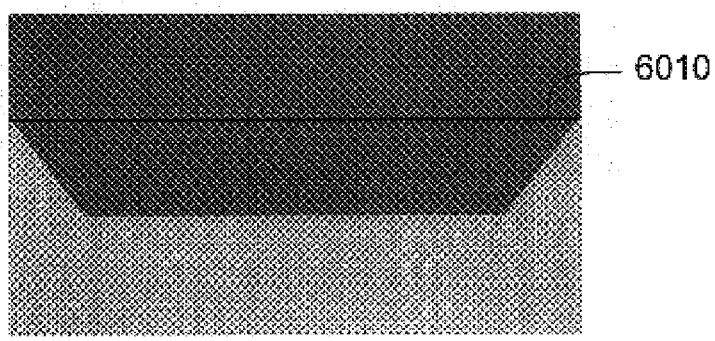
Mitre Angle: Automatic
FIG. 6B
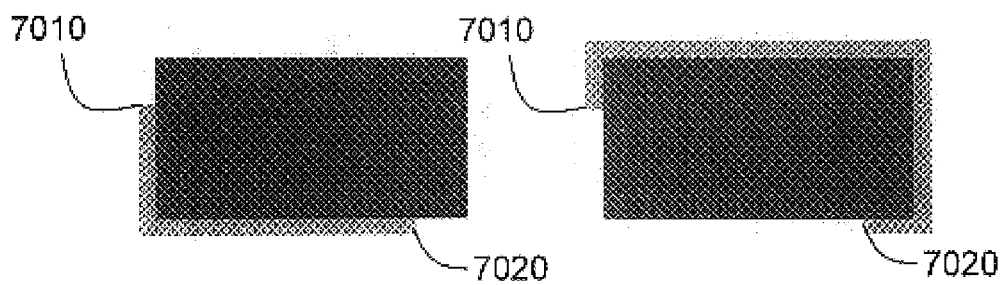
Partial Trap
FIG. 7A
Transposed Partial Trap
FIG. 7B Two Orientations For Each Ray Insideness Finding Mitering Angles

DIGITAL PREPRESS TRAPPING TOOLS

FIELD OF THE INVENTION

This invention generally relates to reproduction of digital artwork. More specifically, the invention relates to software tools for prepress trapping of digital artwork.

BACKGROUND OF THE INVENTION

Color artwork, which often includes a plurality of graphic or text objects, may be reproduced using any of a variety of different printing processes, including offset lithography, gravure, silk screening, or flexography. For an accurate reproduction of color variations using these methods, two or more different inks are applied, for example, to separate lithographic plates. Generally, three different ink colors (and hence three different lithographic plates) are needed to approximately reproduce the spectrum of colors seen with a human eye. However, in some cases, for example, where only gray tones are needed, only two inks are used; in others, for example, where an especially bright or dark color is desired, more than three inks may be used.

Misregistration, or misalignment during a printing process, is often a problem during printing of color artwork. FIG. 1 illustrates an effect of misalignment during offset lithography. The term "registration" refers to the precise positioning of color artwork, for example, by exact positioning of a lithographic plate, roller, or screen with respect to a substrate of paper, rubber, or fabric.

As shown in FIG. 1A, when a second color 120 is printed over a first color 110, a darker third color 130 is produced. Thus, in color artwork reproduction, when such a third color 130 is undesirable, the lithographic plate, roller, screen, or other printing device (such as might be used in lithography, flexography, gravure, silk screening, or some other printing process) that is used to reproduce the first color 110 must be modified by "knocking out" the first color 110 (FIG. 1B), and the printing device for the second color 120 must be modified by "building back" the second color 120 (FIG. 1C). When printing devices are modified as necessary with knockouts and build backs, the second color 120 is reproduced accurately, as shown in FIG. 1D. However, as described above, if the two lithographic plates are misaligned, or if the substrate moves, then the knockout will be slightly offset from the build back, and the substrate (for example, white paper) will show along one edge of the artwork with the darker color 130 appearing along the opposite edge. (See FIG. 1E.)

The problem of misregistration may be alleviated by the use of "traps". Traps include "spreads", "chokes", and are also known as "clips" to some skilled in the art. A spread is an object that has been expanded outwardly (or "spread") into a surrounding background. A "choke" is a background that has been stretched inwardly (or "choked") into an object surrounded by the background. Traditionally, when knockouts and build backs were hand-cut by a master lithographer, chokes and spreads were applied optically by placing a transparent sheet of high index of refraction material between a film negative of a piece of artwork and the knockout or build back. More recently, as computer-aided printing processes have been developed, computer software has been used to apply spreads or chokes to digital artwork in preparation for printing with multiple inks. Commercial prepress software packages, such as Esko-Graphics Barco™ or Artwork Systems Artpro™ are currently available for applying traps to finished artwork. However, the use of such commercial software packages for prepress processing, including the application of color traps, has distinct disadvantages.

Some disadvantages to the use of such commercial software packages for prepress work include the need for file format conversions. The file format of artwork submitted for prepress work is usually different from the file format used by prepress software packages. Finished artwork is usually produced using an artwork production software package, such as Adobe Illustrator™ or Macromedia Freehand™, and must be converted from the file format used by the artwork production software into the file format for the prepress software package before prepress processing can be completed. File conversion errors often result.

Other disadvantages of file conversion include an inability of artists to make even minor changes to artwork already submitted for prepress processing. Thus, artwork usually goes through a long approval process before being submitted for prepress processing. Changes after submission may be costly or impossible. A minor change to a small aspect of artwork submitted for prepress processing may require a large amount of additional work to correct. For example, if a company wishes to make a slight alteration to a text object, the prepress processing might have to be entirely redone. Jobs are often submitted for prepress processing in batch mode so that a single correction to a trap placed on an object cannot be made without reprocessing of the entire job.

An additional disadvantage to the use of such proprietary file formats and software packages is that prepress software packages require extensive training. Hence, additional company resources (beyond those necessary for simply creating artwork) are required for artwork to be prepared for printing. A smaller company might be unable to afford printing of high quality artwork for advertisements or product packaging simply because prepress processing is unaffordable.

Attempts have been made to improve the accuracy and efficiency of trap placement by transferring digital artwork from the native artwork production environment to a server used for digital prepress processing. In systems of this kind (such as the Esko-Graphics TrapX™ system), a piece of digital artwork (such as an Adobe Illustrator™ file) is transferred to a server, which automatically applies traps to text and graphic objects within the file before transferring the file back to the native artwork production environment. Disadvantageously, file conversions (as described above) may be necessary. And although this conventional technique may allow for trap placement criteria to be specified within the native artwork production environment, the traps themselves are applied on a server, outside the native artwork production environment, which creates additional disadvantages.

Disadvantageously, when a server is used, prepress processing is done in batches: all traps needed for a piece of digital artwork are applied (or reapplied) before transfer back from the server. If an error is found by a user within the native artwork production environment, the piece of digital artwork must be resubmitted and reprocessed. Thus, such conventional systems suffer from many of the disadvantages described above (including, for example, the need for file conversions), and may present additional disadvantages in terms of time needed for transfer of large files back and forth through a network, or cost, for example, of purchasing a server and network hardware.

Yet other disadvantages of previous prepress trapping techniques include inefficiencies within prepress software packages for applying traps. Trapping is currently done manually using some commercially available software packages. Each text object or graphic object in a piece of artwork that requires trapping must be processed separately, requiring a specific sequence of steps to be accomplished before a spread or choke is applied. A single object may not require much time, but when thousands of such objects within a single piece of artwork must be processed in this way, methods of manual trap placement are inefficient.

There is, therefore, a need for an efficient prepress tool for applying accurate, high quality traps to digital artwork within a native artwork production environment.

SUMMARY OF THE INVENTION

The present invention meets the foregoing need by providing digital prepress trapping tools designed to function within a native artwork production environment, such as Adobe Illustrator™. The present invention allows for the prepress work of applying high quality traps to be accomplished without conversion to a proprietary file format or transfer of data to and from a server. The trapping tools include tools for automatically generating spreads and chokes according to certain user specified criteria.

Advantageously, in the present invention a digital file of finished artwork that requires prepress processing is trapped within the same software package or application in which it is created (i.e., within the "native" artwork production environment). Spreads or chokes may be applied to every vector art object or text object included in the digital artwork without any file conversion. The invention also allows for a prepress operator to see traps that have been applied within the digital artwork immediately, whereas previous methods for applying quality traps within a host application have required information to be transmitted to and received from a server before traps are displayed.

Using the method and system of the present invention, it is possible for a digital artist to apply traps themselves, removing the need for separate prepress processing of artwork before printing, and allowing for revisions or updates to previously finished artwork to be made more easily than with conventional methods for prepress processing of artwork. In an embodiment, files are not saved in a non-native format or converted to a proprietary software system, and there is no need for files to be reconverted before being viewed by an artist or other user. Furthermore, because the method and system of the present invention may be implemented within a native artwork production environment, the resources required for adequate training in the application of traps to artwork are substantially fewer.

According to the method and system of the present invention, after digital artwork has been approved by a client, the invention is applied in a native artwork production environment, eliminating the need for a conversion of the digital artwork into a different format. After the method of the present invention has been carried out, the digital artwork can be submitted for print processing, for example, as a PostScript format file. The digital artwork submitted is usually received by a Raster Image Processor (RIP) for screen ruling, dot gain analysis, and angle, dot shape or structure assignment. The digital artwork is then sent to an output device, such as a plate or film setter. For gravure printing, the bitmap data is either sent to a digital engraving machine or data is output to film, and engraved on a cylinder. Using the present invention, no prepress trapping outside the native artwork production environment is needed.

In an embodiment, the invention has been implemented as a set of plug-ins for use with Adobe Illustrator™. However, as will be understood by those of ordinary skill in the art, the method and system of the present invention are susceptible to implementation in a plurality of different artwork production environments, for example, in an environment in which the prepress tools are implemented without reference to a previously developed Application Programming Interface (API) or other libraries of software tools. The invention should be understood to include such alternative embodiments since the trapping tools described herein might be implemented by one of ordinary skill in the art in any such alternative embodiments.

In many conventional artwork production software packages, digital artwork is output as a PostScript language file. Hence, much of the terminology used to describe how traps are implemented in the present invention is common to the PostScript programming language. An excellent reference, including a detailed description of some of the PostScript language terms and concepts used in the present application (e.g., paths, Bezier paths, and conventions used with winding algorithms) is publicly available at http://partners.adobe.com/asn/developer/technotes/postscript.html in the third edition of the PostScript Language Reference manual. The digital prepress trapping tools of the present invention are implemented, in an embodiment, as a plug-in for Adobe Illustrator™, a commercial artwork production software package that has conventionally produced PostScript format output files. However, as described above, other programming languages, page description languages, or scripts might also be used to implement the digital prepress tools of the present invention, for example, in Macromedia Freehand™, Adobe Acrobat™, Adobe In Design™, or Corel Draw™. In general, any language or format in which a piece of digital artwork could be submitted for print processing might be used in accordance with the method and system of the present invention, and the present invention can be used with any digital vector artwork production environment or processing system.

The digital prepress tools of the present invention allow a user to apply traps to vector art objects within a design. The term "trap" as used in accordance with the present invention may refer to chokes or spreads (which are sometimes also known as "clips") of a piece of artwork, or to a combination of chokes and spreads.

In accordance with the present invention, a "path" is a graphic object specified by logically connecting at least two points in a definite direction. The path may be rectilinear or may be curved as specified, for example, by designating the points as knots in a Bezier path. A path may be "open" or "closed." Closed paths have a well-defined interior portion. Paths may be "stroked" so that the logically connected points in the path are physically connected by lines, or, in cases where paths are closed, "filled" so that the interior portion of the path has a well-defined color. A closed path may be stroked, filled, both, or neither. In addition, closed paths also have an "orientation" property which is either "clockwise" or "anticlockwise", depending on whether the logical connections between the points of the path are traversed in a clockwise or an anticlockwise direction. ("Anticlockwise" is also known as "counterclockwise.") The direction of traversal, or "orientation" property of a path is sometimes needed in determining whether a particular point within a text or graphic object in a piece of digital artwork lies inside or outside a closed path. (See description below.)

"Compound paths" include groups of one or more other paths that are defined as a single graphic object. Paths included in compound paths are called "subpaths". Subpaths may be filled or empty in accordance with their clockwise or anticlockwise orientation and the "insideness rule" being used. With an even-odd winding rule, the inner circle of two concentric circles will always be empty. With a nonzero winding rule, the inner circle may or may not be filled depending on whether the two subpaths are traversed in parallel (both clockwise or both anticlockwise) or antiparallel (a first clockwise and a second anticlockwise) directions. (See the Postscript Language Reference Manual for additional description.) As is known to those of ordinary skill in the art, any kind of digital artwork (including graphics, text, or both) is susceptible to construction from paths or compound paths. Any kind of digital artwork having paths, vectors, or other similar system for specifying the position of text or graphic objects is susceptible to being adapted for use with the trapping tool of the present invention.

Traps are closed, filled, un-stroked paths that modify the geometry of a vector art object. As is known to those of ordinary skill in the art, all objects in a piece of digital artwork (including paths and compound paths) have a well-defined geometry. The geometry of an object can be modified, for example, when a spread or a choke is applied to an entire path, by expanding or contracting the area defined by the path. In the case of a partial spread or a partial choke, or in the case of a spread or a choke to a compound path, the modification is more complicated. (Some more complicated modifications to the geometry of an object are shown by way of example in FIGS. 3A, 3B, 3E, and 3F.) Advantageously, the present invention allows for the geometry of an object to be modified nondestructively, i.e., without destroying or changing the object being trapped. The ability of the present invention to nondestructively modify the geometry of an object is further described below.

As explained above, traps serve to alleviate the problems associated with misregistration in offset lithography. Traps can be logically divided into four portions: (1) an inner side of a trap uses the same points as the path being trapped; (2) an outer side of a trap is parallel to the inner side of the trap, and offset therefrom (in a direction that depends on whether the trap is a spread or a choke) by a user-specified trap width; (3) the two ends of the trap are formed at user-specified angles to the inner side and the outer side of the trap; and (4) the fill for the trap, which is the same as the fill of the path being trapped in the case of a spread, and the same as the fill of the background to the path being choked in the case of a choke.

According to the method and system of the present invention, each of the four logical portions are constructed automatically using software tools within a native artwork production environment. Separate tools are provided for applying a choke to an entire path ("Choke All"), to a portion of a path ("Choke Part"), or for applying a spread to an entire path ("Spread All") or a portion of a path ("Spread Part"). In some embodiments, a separate "Overprint" tool is also provided for more conveniently specifying how a trap is to be positioned with respect to the object being trapped. In various embodiments, a different subset of these tools may be provided.

When a tool is used, a user provides "user specified criteria" that defines how traps are applied. User specified criteria includes, in an embodiment of the present invention, a trap width, a mitre limit to the pointiness of corners in the path being trapped, the type of mitre joins or mitre angle, and other information about whether or how partial traps are applied. In an embodiment of the present invention in which the trapping tools are implemented within Adobe Illustrator™, the user specified criteria is entered in a "trapping palette." Traps are then applied to objects according to the user specified criteria when an object is selected and an appropriate trapping tool within the toolbox is clicked or otherwise activated.

In an embodiment, the trapping palette is displayed as a window in a native artwork production environment, which presents information and requests input. The trapping palette is displayed, in an embodiment, only while trapping tools are available in a toolbox within the native artwork production environment, and may also be called a "floating palette". Although the embodiment of the present invention shown in FIGS. 2A and 2B includes tools within a toolbox and a trapping palette including numerical fields, pop-up menus, a check box, and a button, it will be understood by those of ordinary skill in the art that a different embodiment might also be implemented, for example, in which the tools are included in a separate dialog box rather than in a toolbox. In addition, a different combination of pop-up menus, checkboxes, option boxes, scrolling lists, slider bars, icons, or buttons might also be used with the present invention, and the system of the present invention should not be understood as limited to the particular embodiment shown in FIGS. 2A and 2B.

According to an embodiment of the present invention, objects within a file of digital artwork are trapped sequentially. After an object has been selected and user specified criteria for the object have been entered (for example, in a trapping palette), an icon for the desired trapping tool (for example, Spread All 2010 in FIG. 2A) is activated, for example, by pressing a hot key or clicking on the tool. The trap is then automatically applied to the selected object. A substantially similar set of steps may be used to apply a Choke All trap to an object within the digital artwork. Spread All and Choke All work automatically with compound paths.

Spread Part 2020 and Choke Part 2040 tools are used in a slightly different way. Again, a single object is selected and user specified criteria are entered, for example, in a trapping palette. However, after entering the user specified criteria and activating either the Spread Part 2020 or the Choke Part 2040 tool, when a user moves his or her mouse over the selected object a numeral "1" appears, indicating that by clicking the user will specify a first trap point. Upon clicking once, the numeral "1" becomes a numeral "2", indicating that by clicking again a second trap point will be placed. After the second point is set with a second click, a trap is automatically applied to the shortest path along the edge (or outer path) of the object being trapped between the two points. According to an embodiment of the present invention, a separate "Transpose" button allows for the trapped path to be swapped for the longest path between the two points along the edge of the selected artwork instead. As described below, Spread Part and Choke Part tools also work automatically with compound paths or shapes, grouped paths, or non-compound paths or shapes. An important advantage of the Spread Part and Choke Part tools is that the first and second points can be set at any point along the edge of any kind of object.

The use of hot keys presents an additional advantage of embodiments of the present invention. As an alternative to selecting trapping tool icons, in another embodiment a user presses a "Hot Key" on a keyboard. In an embodiment, Hot Key "1" activates Spread All, Hot Key "2" activates Choke All, Hot Key "3" activates Spread Part, Hot Key "4" activates Choke Part, Hot Key "0" activates the Transpose button, and Hot Key "5" toggles (activates or deactivates) an Overprint setting. A user skilled with in the use of such Hot Keys may save a considerable amount of time in applying traps to a plurality of objects within a piece of digital artwork. Other keyboard shortcuts might be used in a different embodiment of the present invention.

In another embodiment of the present invention, trapping tool icons in a toolbar or toolbox might be selected from a single trapping tool icon with a pop-up "flyout" toolbar. Flyout toolbars may be displayed, for example, after a corner of an icon is clicked, or after the mouse has hovered over the icon for longer than a specified interval of time. In yet another embodiment, the trapping tools might be displayed in a free-floating palette, which might accessible by "tearing off" a flyout toolbar from the main toolbar in an artwork production environment.

Advantageously, the present invention does not modify or destroy objects trapped in a piece of artwork. In addition, objects are not transferred to a server before being trapped, and trapped are applied without leaving the native artwork production environment. In an embodiment, the objects being trapped remain continuously within the native artwork production environment. As a result, the present invention lessens the need for additional hardware (for example, for expanding the bandwidth of the network used for transferring large graphics files back and forth from a server) and software for prepress processing.

Perhaps more importantly, the present invention does not require prepress processing of objects in a piece of digital artwork to be done in batch; rather, individual graphic or text objects may be modified instantly within the native artwork production environment, and reprocessing of other objects within a piece of digital artwork is unnecessary. Also, because the traps are applied nondestructively (i.e., the original object is not deleted from computer memory), traps already applied to an object may be easily modified or removed, reproducing the original, un-trapped object.

BRIEF DESCRIPTION OF THE DRAWINGS

The foregoing and other objects, advantages, and features of the present invention will be apparent from the following detailed description and the accompanying drawings, in which:

FIG. 4A shows an example of a mitred join, in accordance with an embodiment of the present invention;

FIG. 4B shows an example of a rounded mitre join, in accordance with an embodiment of the present invention;

FIG. 4C shows an example of a bevelled mitre join, in accordance with an embodiment of the present invention;

FIG. 5A shows a positive mitre limit, in accordance with an embodiment of the present invention;

FIG. 5B shows a zero mitre limit, in accordance with an embodiment of the present invention;

FIG. 6A shows a partial trap with no mitre angle, in accordance with an embodiment of the present invention;

FIG. 6B shows a partial trap with an automatically calculated mitre angle, in accordance with an embodiment of the present invention;

FIG. 7A shows an untransposed partial trap, in accordance with an embodiment of the present invention;

FIG. 7B shows a transposed partial trap, in accordance with an embodiment of the present invention;

DETAILED DESCRIPTION OF THE INVENTION

Figure 1A:
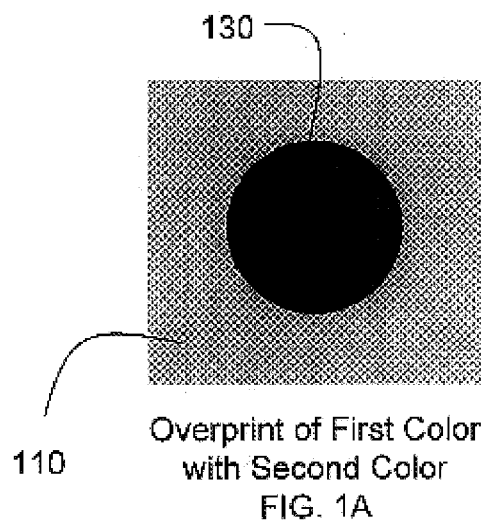
FIG. 1A shows an overprint of a first color with a second color, in accordance with an embodiment of the present invention.
Figure 1B:
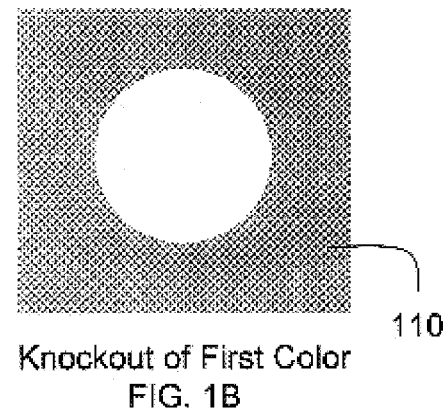
FIG. 1B shows a knockout of a first color, in accordance with an embodiment of the present invention.
Figure 1C:
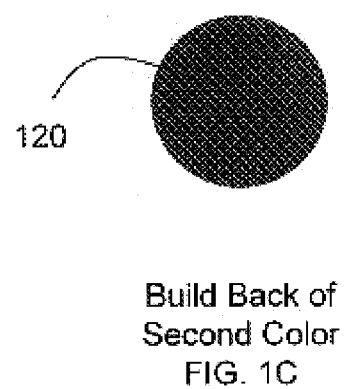
FIG. 1C shows a build back of a second color, in accordance with an embodiment of the present invention.
Figure 1D:
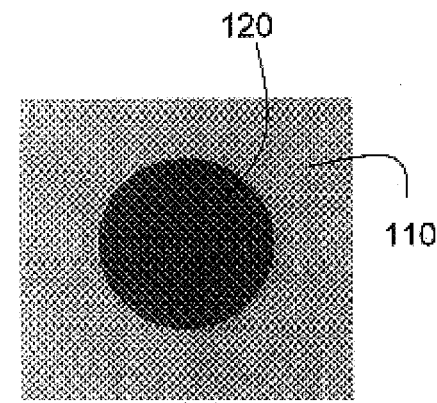
FIG. 1D shows a knockout of a first color with a build back of a second color, in accordance with an embodiment of the present invention.
Figure 1E:
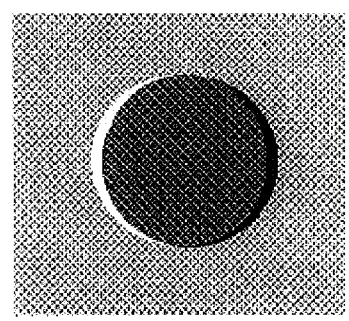
FIG. 1E shows misregistration of the knockout of FIG. 1B with the build back of FIG. 1C, in accordance with an embodiment of the present invention.
Figure 2A:
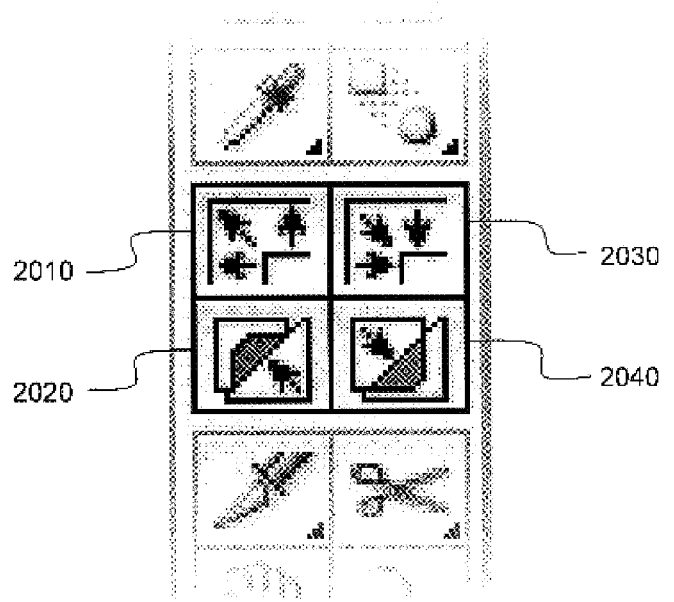
FIG. 2A shows a screen shot of a toolbox, in accordance with an embodiment of the present invention.
Figure 2B:
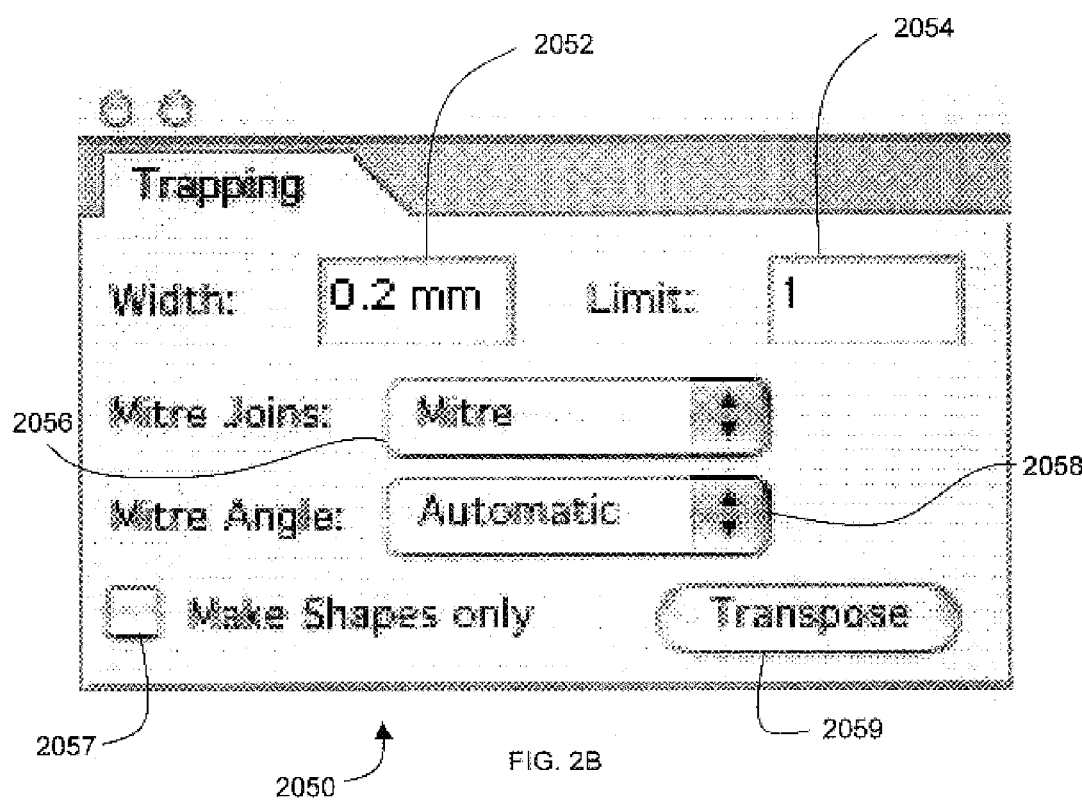
FIG. 2B shows a screen shot of a trapping palette, in accordance with an embodiment of the present invention.

As described above, in one embodiment the digital prepress trapping tool is implemented as a plug-in for Adobe Illustrator™. FIGS. 2A and 2B show screenshots of trapping tools in a toolbox and a trapping palette in accordance with an embodiment of the invention implemented within Adobe Illustrator™.

In an embodiment, there are four basic digital prepress tools in the present invention, which are displayed as icons in a portion of a toolbox shown in the magnified screen shot of FIG. 2A: Spread All 2010, Spread Part 2020, Choke All 2030, and Choke Part 2040. An exemplary description of how the tools are used in a native artwork production environment has been described in the SUMMARY OF THE INVENTION section above. The specific methods used to implement the tools within a native artwork production environment are described further below. However, an illustrative example of the effect of the tools on a selected piece of artwork is shown in FIGS. 3A–F.

In FIG. 3, the paths being trapped are outlined with a solid black line. The solid black lines are shown for ease of explanation, and would not usually be present in an object being trapped within a native artwork production environment. FIGS. 3C and 3D show examples of the effect of the Spread All 2010 and Choke All 2030 tools on a selected graphic (in this case, an oval). The spread oval 3020 shown in FIG. 3C has been extended around its entire outside edge 3025 into the surrounding white background. The choked oval 3050 shown in FIG. 3D has shrunk around its entire outside edge 3055 away from the surrounding white background.

Figure 3A:
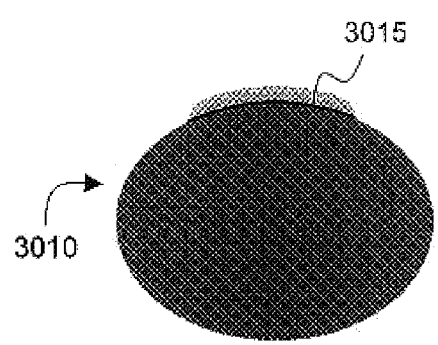
FIG. 3A shows a partial spread of a piece of artwork, in accordance with an embodiment of the present invention.
Figure 3B:
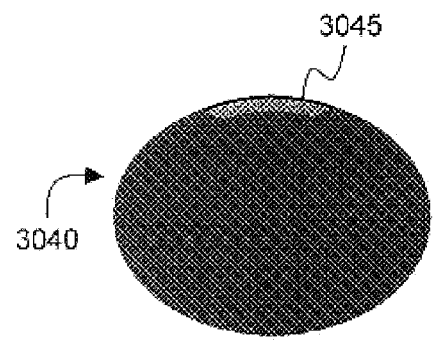
FIG. 3B shows a partial choke of a piece of artwork, in accordance with an embodiment of the present invention.
Figure 3C:
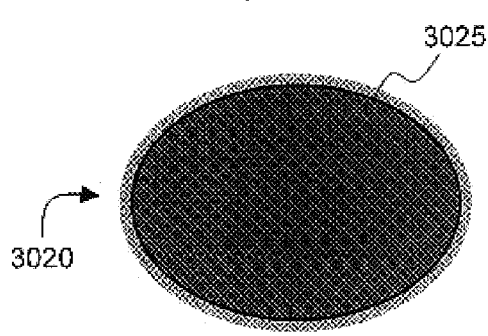
FIG. 3C shows a spread of an entire piece of artwork, in accordance with an embodiment of the present invention.
Figure 3D:
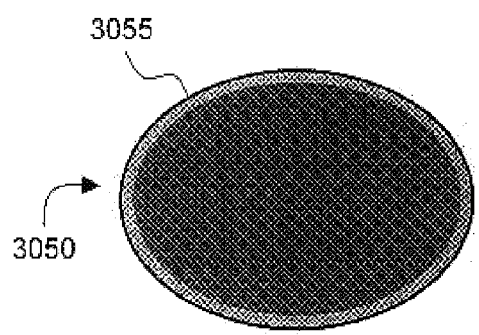
FIG. 3D shows a choke of an entire piece of artwork, in accordance with an embodiment of the present invention.

FIGS. 3A and 3B show examples of the effect of the Spread Part 2020 and Choke Part 2040 tools on a selected graphic. The partially spread oval 3010 shown in FIG. 3A has been extended along a portion of its outside edge 3015 into the white background. The partially choked oval 3040 shown in FIG. 3B has shrunk along a portion of its outside edge 3045 away from the surrounding white background.

Figure 3E:
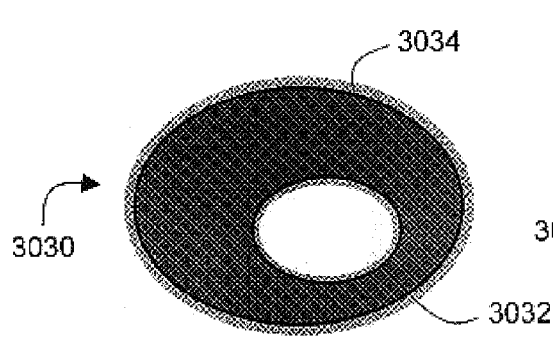
FIG. 3E shows a spread of several pieces of artwork, in accordance with an embodiment of the present invention.
Figure 3F:
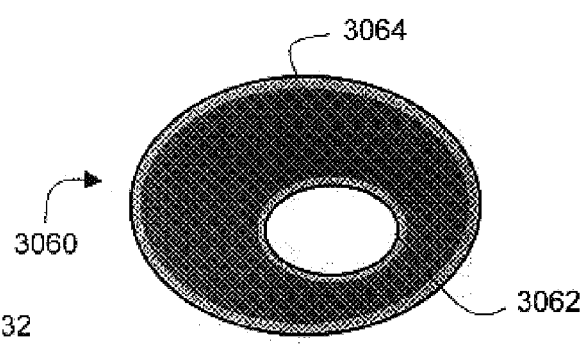
FIG. 3F shows a choke of several pieces of artwork, in accordance with an embodiment of the present invention.

FIGS. 3E and 3F show examples of the effect of the Spread All 2010 and Choke All 2030 tools on a selected graphic that includes a compound path (in this case, two concentric ovals 3030 and 3060). As shown in FIG. 3E, the inner oval 3032 has been spread inwardly whereas the outer oval 3034 has been spread outwardly. (Note that the black outline indicates the edge of the inner oval 3032 and outer oval 3034 before the traps had been applied.) The direction of spreading is determined by the present invention according to the "insideness" property of a path or subpath, as further described below. As shown in FIG. 3F, the insideness property is also used to determine the direction of choking to a subpath within a compound path: the inner oval 3062 has been choked outwardly toward the outer oval 3064, while the outer oval 3064 has been choked inwardly toward the inner oval 3062. The direction in which a spread or choke within a compound path must be applied to a subpath in a compound path is determined automatically by the present invention.

Referring to FIG. 2B, there is shown a magnified screen shot of a trapping palette 2050 according to an embodiment of the invention. As shown in FIG. 2B, the trapping palette 2050 includes numerical fields that allow a user to specify trap width (using the "Width" field 2052) and set limits to the pointiness of a trap corner (using the "Limit" field 2054). In addition, an embodiment of the invention includes pop-up menus that allow a user to specify the type of mitre joins to be applied (using the "Mitre Joins" pop-up menu 2056), and to specify mitre angles (using the "Mitre Angle" pop-up menu 2058). The optional "Make Shapes Only" checkbox 2057, when checked, fills any applied traps with white (and not with the color of the path being trapped). The "Transpose" button 2059 is used to modify partial traps, and is further described below.

In the embodiment of the present invention shown in FIG. 2B, trap widths are specified in units of millimeters. However, in another embodiment of the invention, other units such as inches, pixels, or points might also be used. In some artwork production software packages a default may be set. For example, Adobe Illustrator™ allows for a user-specified "preference" of the unit of measurement. In an embodiment, the present invention allows for the unit preference to be overridden by typing in a numerical value in a different unit of measurement. The measurement is then automatically converted into the unit preference. For example, if the unit preference were set to "inches", a user could input "0.3 mm" into the trap art tool, and the measurement would be automatically converted to "0.01 inches".

Three different kinds of mitre joins, which are selected, in an embodiment, using the Mitre Joins pop-up menu 2056 shown in FIG. 2B, are illustrated by way of example in FIGS. 4A–C. As shown in FIG. 4A, a "Mitred" type mitre join produces sharp points where two edges of a spread or choke path meet, the "Rounded" type mitre join automatically rounds off the edges of an applied trap, and a "Bevelled" type mitre join cuts off the edges of a trap at an angle to each of the edges of a corner of the path being trapped.

FIGS. 5A–B illustrate the use of the Limit field in adjusting trap corners. As shown in FIG. 5B, when the limit field is set to zero, traps may extend far beyond the path of the object being trapped at small-angled corners. As shown in FIG. 5A, by setting the mitre limit field to a positive, non-zero value, trap corners may be limited.

FIGS. 6A–B illustrate how a partial trap may be modified using the Mitre Angle pop-up menu 2058. In an embodiment of the present invention, the Mitre Angle pop-up menu 2058 has options "Automatic" and "None". As shown in FIG. 6A, when None is selected from the Mitre Angle pop-up menu, the ends of a partial spread or choke are placed perpendicular to the path being trapped 6010. (An outline of the path is shown as a black line for ease of explanation only; paths being trapped would not usually appear with black outlines in native artwork production environment.) When Automatic is specified, the edges of the partial trap form an angle calculated using a method described below in connection with FIGS. 12 and 13. The Mitre Angle pop-up menu 2058 has no effect on traps applied using Spread All 2010 or Choke All 2030.

Referring to FIGS. 7A–B, there is illustrated the effect of a Transpose button 2059 on a partial trap. When a partial trap is first applied, the trap is placed along the shortest distance between a first point 7010 and a second point 7020. By clicking the Transpose button 2059, the trap is automatically reapplied to the portion of the edge of the path being trapped that produces the greater distance between the points 7010 and 7020. Note that the length of the trap in FIG. 7A is shorter than the length of the trap in FIG. 7B. Of course, in another embodiment of the present invention, the longer path might be selected by default, and the shorter after a transpose function had been activated.

In accordance with the present invention, when a trap is applied to a compound path, a property of "insideness" must be defined and determined. Human beings are easily able to identify what area of a closed path is inside the closed path, and what area is outside. However, in order for a computer program to identify the inside of a closed path, a special method must be implemented.

In an embodiment, when a digital object, such as a compound path, is trapped by a computer program, the program must first determine the direction in which a trap should be offset from the object being trapped. This is important because, as described above, the direction in which a trap is offset from the path being trapped is not arbitrary: a spread is outwardly offset from the path being trapped (see FIGS. 3A and 3C); a choke is inwardly offset from the path being trapped (see FIGS. 3B and 3D). A property of insideness is defined, in accordance with the present invention, using a closed path as a reference path. Both points and vectors have a defined property of insideness. In an embodiment, the property of insideness has Boolean values "inside" and "outside". A point is defined to be "inside" when the point would be painted if the reference path were to be filled. A point is defined to be "outside" when the point would not be painted if the reference path were to be filled.

Figure 9:
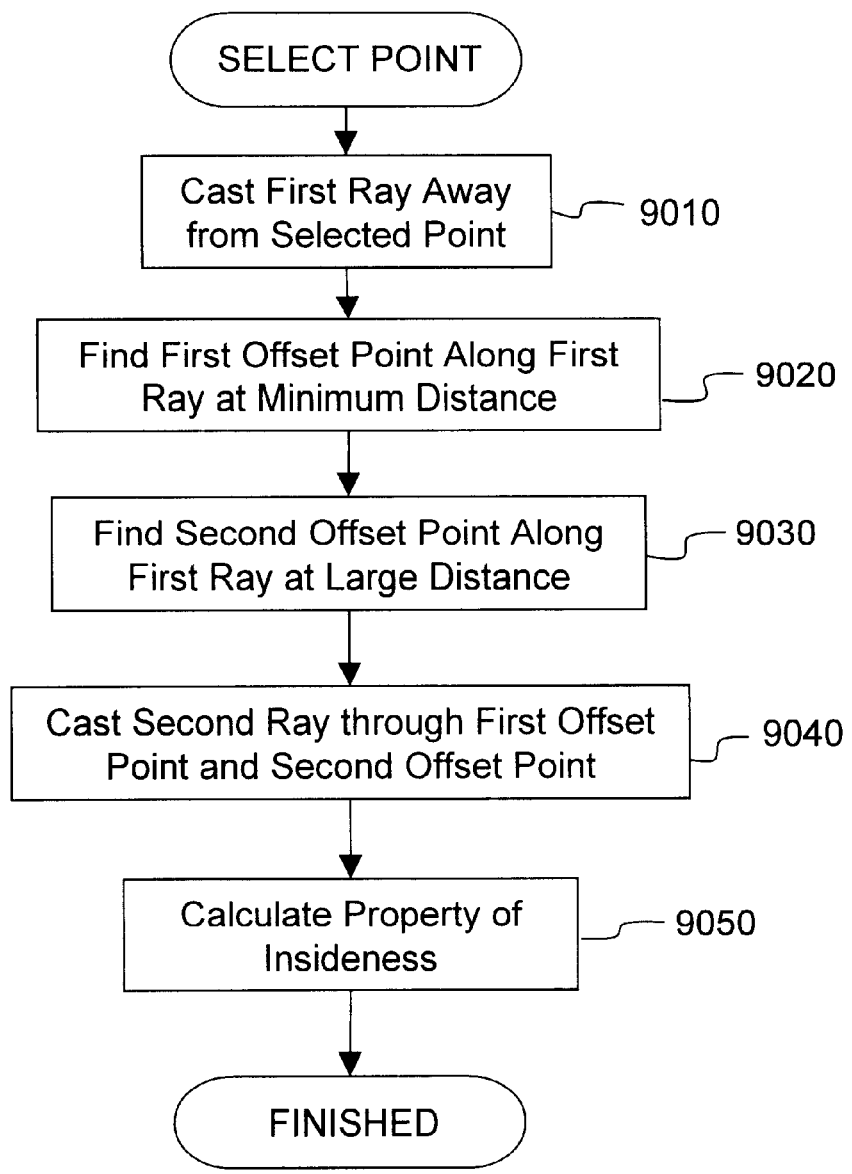
FIG. 9 shows a flowchart for a method of determining insideness, in accordance with an embodiment of the present invention.

In an embodiment of the present invention, the insideness property of a point within a subpath of a compound path is determined using a method shown in FIG. 9. In another embodiment of the present invention, the insideness property might be determined using a different method, for example, by bitmapping the artwork and checking for colored pixels on either side of the coordinates for a selected path. However, the method described in connection with FIG. 9 is advantageous because the method of FIG. 9 has improved accuracy and is more efficient than other methods, such as a bitmapping method.

Referring to FIG. 9, the method for determining the insideness property of a selected point begins, in step 9010, with casting a first ray from a selected point. In an embodiment of the present invention, the first ray is cast perpendicular to the path on which the selected point lies, and originates from the selected point (i.e., the ray is a normal to the path at the selected point). It is not necessary to the method of the present invention that a normal be calculated. Any horizontal or vertical line forming a consistent angle with the path at the selected point might be used. The use of a normal is, however, advantageous because the normal is unlikely to immediately intersect the path on which the selected point lies, even when the path is sharply curved.

Figure 8A:
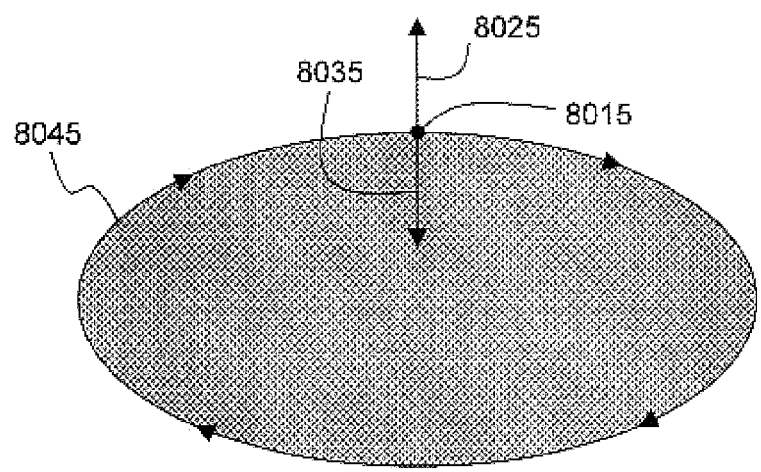
FIG. 8A shows a diagram illustrating two orientations for a ray cast from an object, in accordance with an embodiment of the present invention.
Figure 8B:
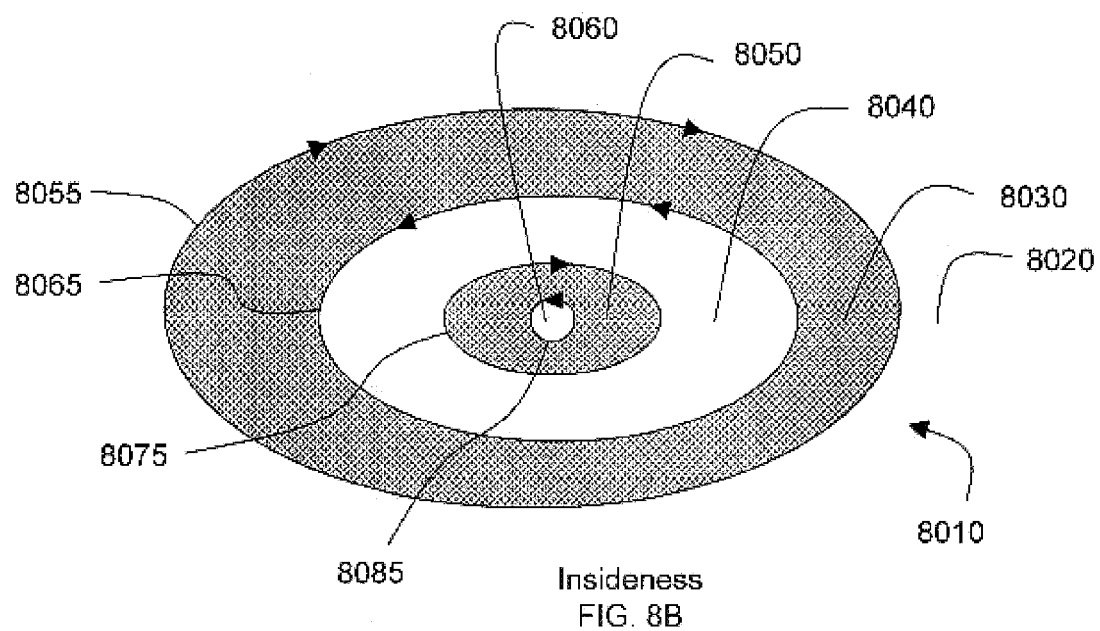
FIG. 8B shows a diagram illustrating the property of insideness, in accordance with an embodiment of the present invention.

As shown in FIG. 8A, the first ray cast in step 9010 (which, in an embodiment, is a normal) may extend in either of two directions (separated by 180°). The first ray may point away from the inside of the object being trapped (arrow 8025) or toward the inside of the object being trapped (arrow 8035). For use with nonzero winding algorithms, the direction of the ray cast in step 9010 is selected according to the orientation of the path on which the selected point lies. For example, in an embodiment, the ray is always chosen to point leftwardly away from the direction of traversal. Using this convention, the outermost path in a compound path should have a clockwise orientation (like paths 8045 and 8055 in FIGS. 8A and 8B), so that a leftwardly pointing arrow (8025 in FIG. 8A) also points outwardly. And whenever a path is placed inside another path (for example, when path 8065 in FIG. 8B is placed inside path 8055), the orientation of the path is reversed (path 8065 is anticlockwise when path 8055 is clockwise). As is known to those of ordinary skill in the art, the ray must be chosen consistently with the orientation of the path so that nonzero winding algorithms may be used to determine a property of insideness. Nonzero winding algorithms work by incrementing a count when a clockwise path is crossed and by decrementing the count when an anticlockwise path is crossed (or vice versa) in a defined direction (e.g., from inside to outside or vice versa). If the count is zero at a large distance from the object, then the point is outside; if the count is nonzero, the point is inside.

Compound paths must also be constructed so that the orientation of subpaths accurately reflect when a region within the compound path is "outside". FIG. 8B provides a diagram showing by way of example how the insideness property is defined for a compound path (four concentric ovals 8010) so that insideness can be determined using a nonzero winding algorithm. Assume that the convention of using a leftwardly pointing arrow 8025 (rather than a rightwardly pointing arrow 8035) is followed. Then "outside" will always be to the left of an ant crawling in the direction of the arrows in FIG. 8B. As shown in FIG. 8B, the regions of the two concentric ovals 8010 labeled 8020, 8040, and 8060 are "outside" and the regions labeled 8030 and 8050 are "inside". Note that the regions 8040 and 8060 are "outside" even though the regions 8040 and 8060 appear within the outer oval (region 8030). Hence, a point may be determined to be "outside" even when it exists within the interior of a closed, compound path. Also note that the paths 8055, 8065, 8075, and 8085 alternate from clockwise to anticlockwise to clockwise, etc., so that a leftwardly pointing arrow is also pointing "outside."

Returning to FIG. 9, after the first ray has been cast in step 9010, the position of a first offset point is calculated in step 9020 along the first ray at a minimum distance (allowed within the precision of the number representation being used). In step 9030, a second offset point is calculated at a large distance along the first ray. Then, in step 9040, a second ray is cast between the first offset point and the second offset point. (In an embodiment of the invention in which the first ray cast is approximately normal to the path being trapped, the second ray will be approximately tangent to the path being trapped.) Using standard even-odd or nonzero winding algorithms, as would be known to those of ordinary skill in the art, in step 9050 the insideness of the point is determined by traversing the second ray and counting path crossings.

Figure 10:
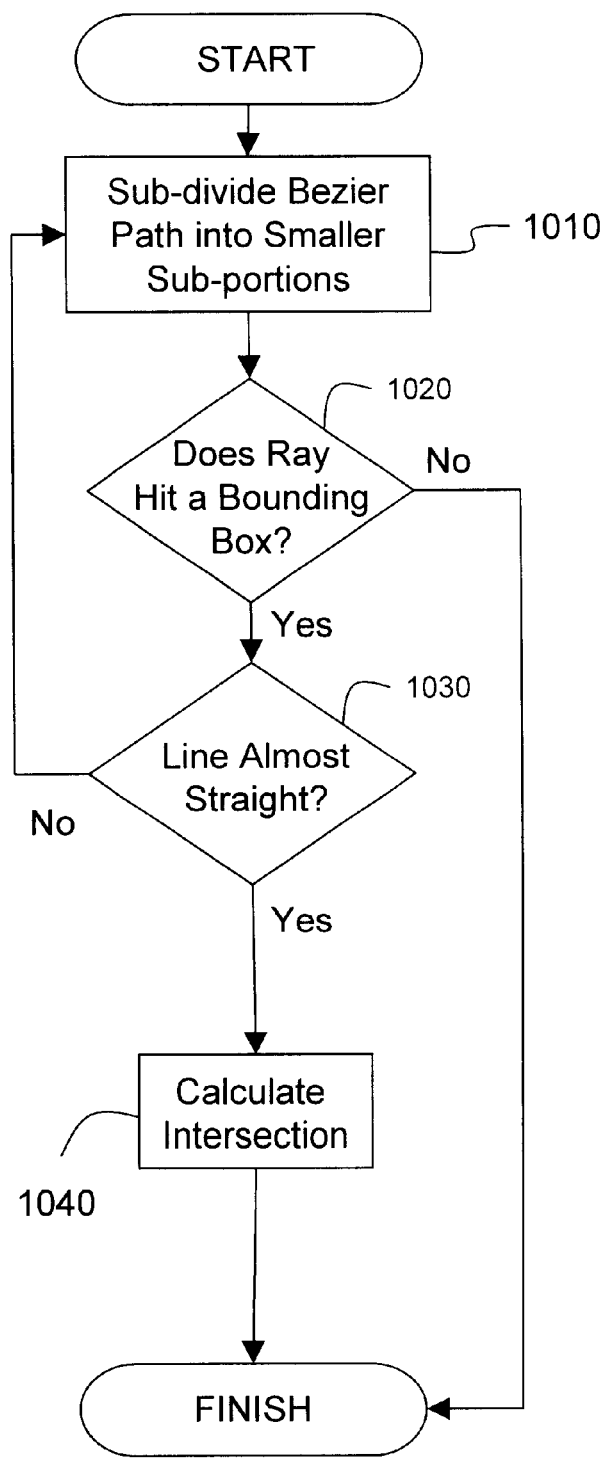
FIG. 10 shows a flowchart for a method of calculating intersections with a curved path, in accordance with an embodiment of the present invention.

Advantageously, the present invention includes an auxiliary method for determining curved path crossings. To improve efficiency of the winding algorithms used in step 9050, path crossings for curved paths are determined in step 9050 by checking first for intersections with bounding boxes of successively shorter portions of a Bezier subpath. FIG. 10 shows a flowchart of one embodiment of this method. In step 1010, the Bezier path is divided into sub-portions, and the bounding box for each sub-portion is hit tested against the second ray. In step 1020, it is determined whether a bounding box for the Bezier path has been hit. If the second ray does not hit a bounding box for a sub-portion of the Bezier path, then there is no intersection with the Bezier path and the method is finished.

If the second ray is found, in step 1020, to hit a bounding box, then the sub-portion of the Bezier path associated with the bounding box hit is checked, in step 1030, to see if the size of the bounding box (or the curvature of the Bezier path itself) is small enough such that further subdivisions are unnecessary. In an embodiment of the present invention, when the size of the bounding box is much smaller than the size of the Raster Image Processor (RIP) pixel width or floating point value tolerance used for measurements in PostScript format files, further subdivisions are unnecessary. (As is known to those of ordinary skill in the art, a RIP is used to prepare a digital image for printing by scanning a finished piece of artwork.) If the line is approximately straight according to the criteria used in step 1030, then the intersection is calculated for that section of the Bezier path itself in step 1040. If the Bezier path is still too curved, or if the size of the bounding box is still too large (by the criteria used in step 1030), then the method may repeat by recursively subdividing the sub-portion of the bounding box intersected, repeating from step 1010 the steps of FIG. 10 with a subdivided sub-portion of the Bezier path. The method of FIG. 10 advantageously decreases the computing resources needed to calculate intersections for a curved path, as required by step 9050 of FIG. 9.

In an embodiment of the invention, should a user desire to change a positive offset to a negative offset (or vice versa), the insideness for the trap might be flipped by holding down a key on a keyboard while the trap is being applied. This aspect of the invention effectively allows for spreads to be turned into chokes (or vice versa), and the use of such an additional step is optional. In an embodiment, such a step may be accomplished by reassigning a rightwardly pointing arrow (8035 in FIG. 8A) to the paths being trapped.

One of the difficulties overcome by the present invention results from the calculation of paths offset from a curved line segment. Curved line segments are in an embodiment calculated using points in the path as Bezier knots. Unfortunately, there has not yet been given a closed form mathematical solution to the problem of calculating a second Bezier path that is exactly parallel to a first Bezier path. The present invention overcomes this problem, in one embodiment, by outlining a stroke on a path in order to offset the path. However, in another embodiment, the problem might be solved by fitting a second Bezier curve to the set of points comprising a fixed distance along the normals (or along some other rays cast at a fixed angle to the curve) to the first Bezier curve. By computing the normals in smaller and smaller increments, this approximate solution to the offset Bezier curve problem might be improved.

When the artwork trapped is a piece of text, the outlline of the characters of the text is determined. In an embodiment, this is accomplished using Adobe Illustrator™ APIs. However, in other embodiments, Adobe Type Manager™ APIs, operating system APIs, or a font parsing library might also be used to determine the outline of text characters.

As described above, in an embodiment of the present invention, partial traps are applied along the shortest path between two points on the edge of the path being trapped. In accordance with the present invention, the length between two points on a curved path, which is always assumed to be closed, is found by iterating through the points on the curved path between the two points in both directions, and by summing the lengths throughout the iteration. The smaller sum is then chosen for use in applying a partial trap (unless the partial trap is being transposed, as explained above). An embodiment of the method for applying partial traps is illustrated with a flowchart in FIG. 11.

In an embodiment, the distance of a portion of a Bezier path that includes end points for the path is measured without adding the length of the entire section of the curve on which the end points lie. This length is accounted for by adding to the distance only the section of length that has been laid on one side of one of the end points. Using this procedure, the distance between two points on a curved (Bezier) path is consistently defined for use in the methods of the present invention.

The method begins, in step 1110, when (after activation of a partial spread 2020 or partial choke 2040 tool) the user clicks on a first point along the path being trapped. In an embodiment of the present invention, a numeral "1" may replace a default mouse cursor after a partial spread 2020 or partial choke 2040 tool has been activated in order to indicate that, by clicking, the first point will be set. After step 1110, the numeral "1" may be replaced by a numeral "2", indicating that, by clicking, the user will set a second point along the same path, and complete step 1120. As noted above, an advantage of the method and system of the present invention is that partial spreads or chokes need not be placed at intersections between two or more objects in a piece of artwork. Rather, the first and second points may be placed anywhere along a path. Another advantage of the present invention is achieved through the changing of the mouse cursor described. Paths are more easily identified according to method and system of the present invention.

The method of applying traps continues, in step 1130, by determining the orientation (i.e., the direction of traversal) of the path being trapped. As discussed above in connection with FIGS. 8A–B and 9, the orientation of the path may be used in order to determine the direction in which a spread or choke must be offset with respect to the path being trapped. In step 1140, a copy is made of the entire path being partially trapped (i.e., including the portions of the path not between the first and second points). Since paths are always traversed in either the clockwise or anticlockwise direction, it may be necessary for a jump to be made from a point at the end of the path to a point at the beginning of a path in order for a complete copy of the path to be made. This "wrapping around" is performed automatically in step 1140. Copying of the path being trapped in step 1140 also provides an advantage of the present invention, because the copying of the path being trapped allows for the original path to remain unmodified. Since the original path is unmodified, traps placed using the present invention are easily removed to reveal original, unmodified objects within a piece of digital artwork.

The copy of the path generated in step 1140 is offset in step 1150 (in the direction determined during step 1130). Although there may be many different ways to offset a path in a native artwork production environment, such as Adobe Illustrator™, in an embodiment, the present invention uses expanded strokes. The expanded stroke method, which is carried out in step 1150 comprises sub-steps, including: (1) stroking the shape of the path copy with a double-width stroke twice the width of the offset desired (the desired offset width having been previously specified by a user, for example, using the trapping palette 2050); (2) converting the double-width stroke to a path (for example, using an Adobe Illustrator™ "pathfinder" tool); and (3) extending the path by combining the path being trapped with the converted path using a Boolean geometry algorithm (for example, using the Adobe Illustrator™ pathfinder facility) to make an expanded or contracted version of the path being trapped. As will be recognized by those of ordinary skill in the art, step 1150 might be carried out using different software programs or tools in a variety of different ways. The present invention should be understood to include any such alternative embodiments that allow for a copied path to be offset, as indicated in step 1150.

Figure 11:
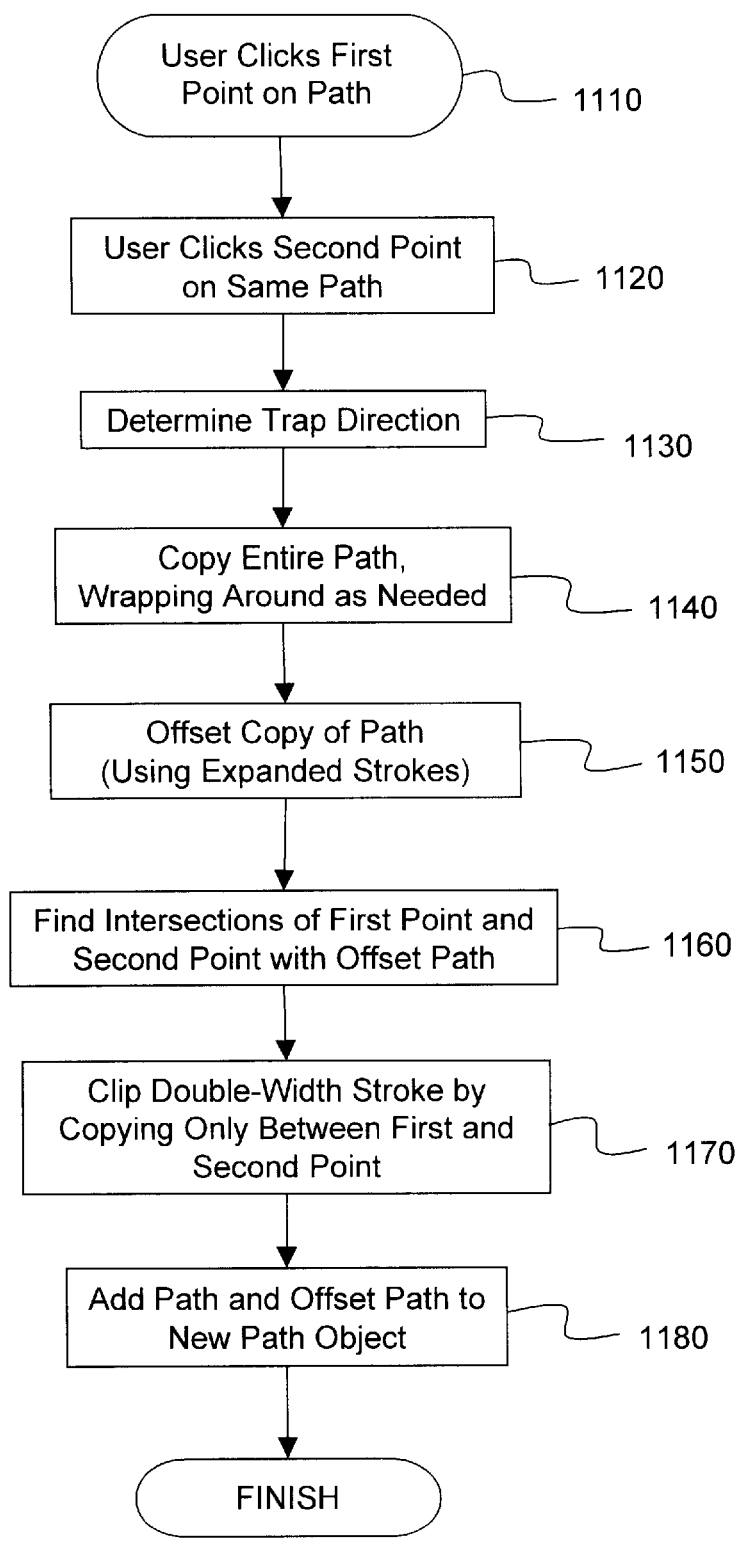
FIG. 11 shows a flowchart for a method of applying partial traps, in accordance with an embodiment of the present invention.

The method shown in FIG. 11 for applying partial traps continues, in step 1160, with a calculation of where the first and second points specified by the user in steps 1110 and 1120 intersect the offset path generated in step 1150. In step 1170, the double-width stroke created in step 1150 is clipped to the intersection points found in step 1160, and then copied so that only a portion of the path between the first and second points is used in the partial trap. The path being trapped and the offset (partial) path created in the preceding step 1170 are added to a new path object in step 1180, finishing this embodiment of the method for applying partial traps in a native artwork production environment.

Figure 16:
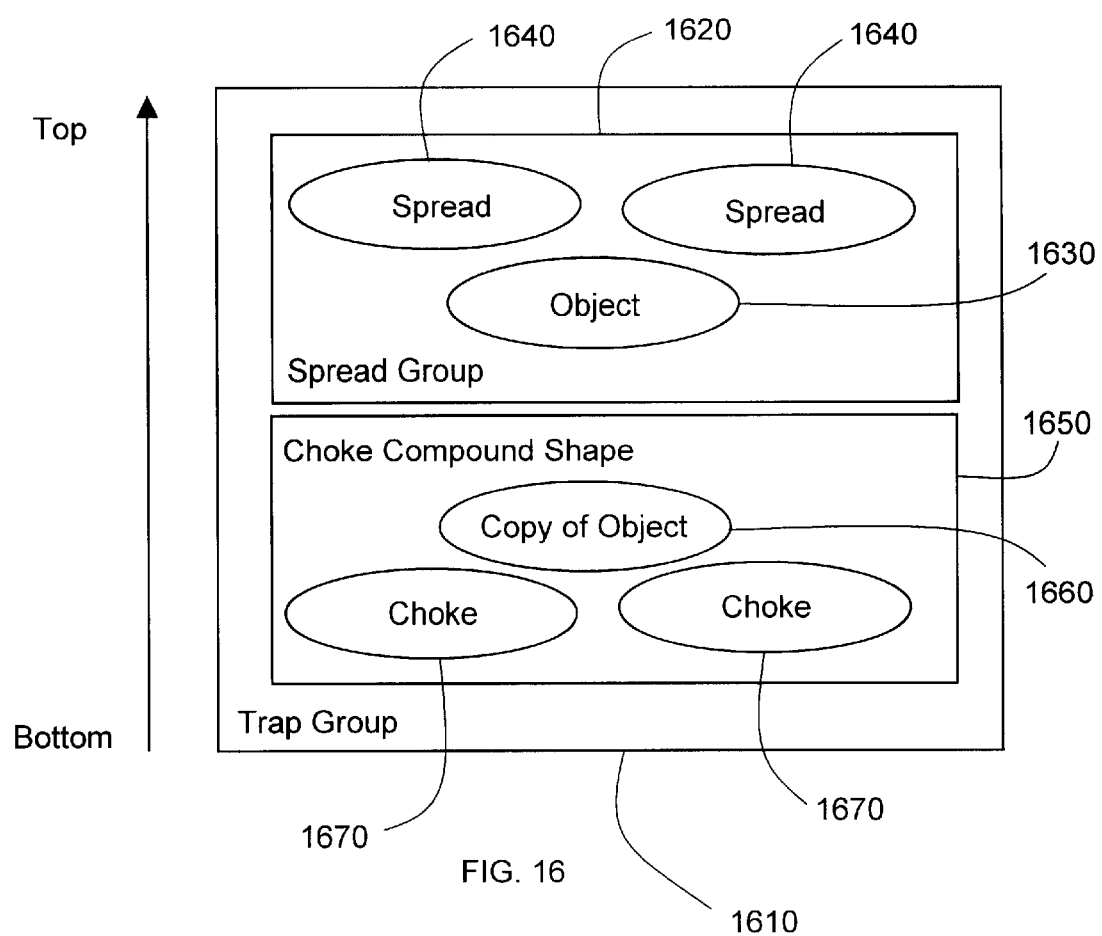
FIG. 16 shows a diagram illustrating how traps and trap groups are positioned with respect to one another, in accordance with an embodiment of the present invention.

In another embodiment of the present invention, traps are kept with the artwork for which the traps have been generated using the Adobe Illustrator™ "group objects" facility. Referring to FIG. 16, there is shown an embodiment of how traps are grouped in accordance with the present invention. The layout of a trap group 1610, which includes both traps and trapped artwork, is well defined within the present invention. Artwork having spreads applied is part of a spread group 1620, a top level group that includes an object 1630 underneath spreads 1640 applied over the object 1630. (Spreads 1640 are set to overprint the object 1630.) Artwork having chokes 1670 applied, or having both spreads 1640 and chokes 1670 applied, is part of the trap group 1610 that includes both a spread group 1620 and a choke group 1650. In addition to any spreads 1640 set to overprint the object 1630, the object 1630 is also set to overprint the choke group 1650. Below a spread group 1620, the choke group 1650 includes a copy of the object 1660 set to a white fill, which is made part of a compound path or compound shape 1650. Chokes 1670 are subtracted from the copy of the object 1660 by being added to the compound path or shape (for example, using a pathfinder tool). The choke 1670, copy of the object 1660, and compound path or shape together comprise the choke group 1650. Advantageously, even when no chokes 1670 are placed, a copy of the object 1660 is made and placed in a trap group 1610, leaving the original object 1630 unmodified or destroyed by the method of trapping.

In another embodiment of the present invention, artwork, including any traps that have been applied to the artwork, are identified using the Adobe Illustrator™ "tagging" mechanism. The parameters used to make a trap could also be stored as tags. The use of tagging and grouping allows for traps to be easily identified, edited, and deleted from a piece of digital artwork.

Although the tagging mechanism is used in embodiments of the invention that are implemented within Adobe Illustrator™, any method of identifying objects within artwork might also be used. In a different embodiment, a method that allows for an object to be associated with identifying information (including whether or not the object is trapped or how the object is trapped) might be used. The Adobe Illustrator™ tagging mechanism is convenient because tags are stored together with the digital artwork. However, in another embodiment, the information stored in Adobe Illustrator™ tags might be stored within a plug-in group, and it is not necessary to the present invention that Adobe Illustrator™ be used.

In an embodiment of the present invention, the mitre angle of traps applied to objects within a piece of digital artwork (such as an Adobe Illustrator™ or Macromedia Freehand™ file) are fixed at either a forty-five or a ninety degree angle. However, in some cases, an automatically calculated bevel angle is desirable.

Figure 12:
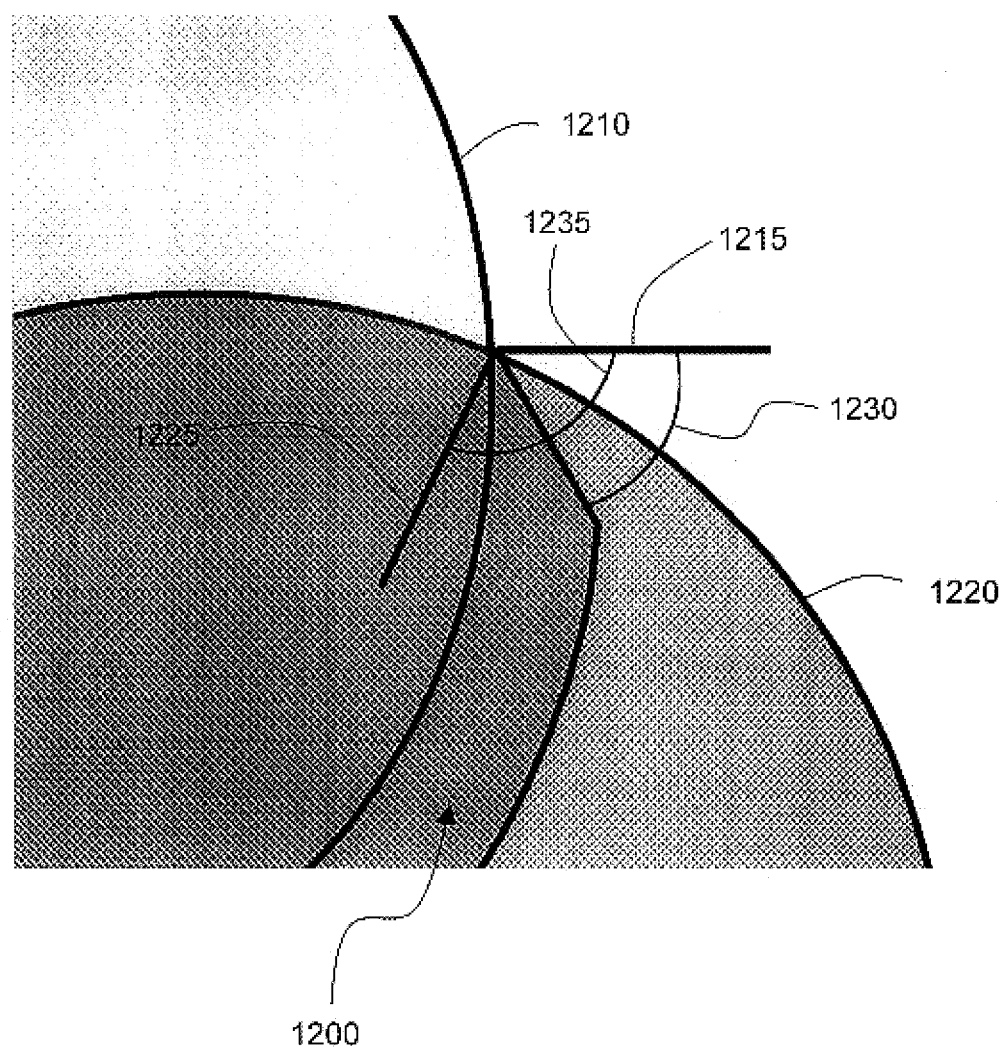
FIG. 12 shows a diagram illustrating the automatic calculation of mitre angles, in accordance with an embodiment of the present invention.
Figure 13:
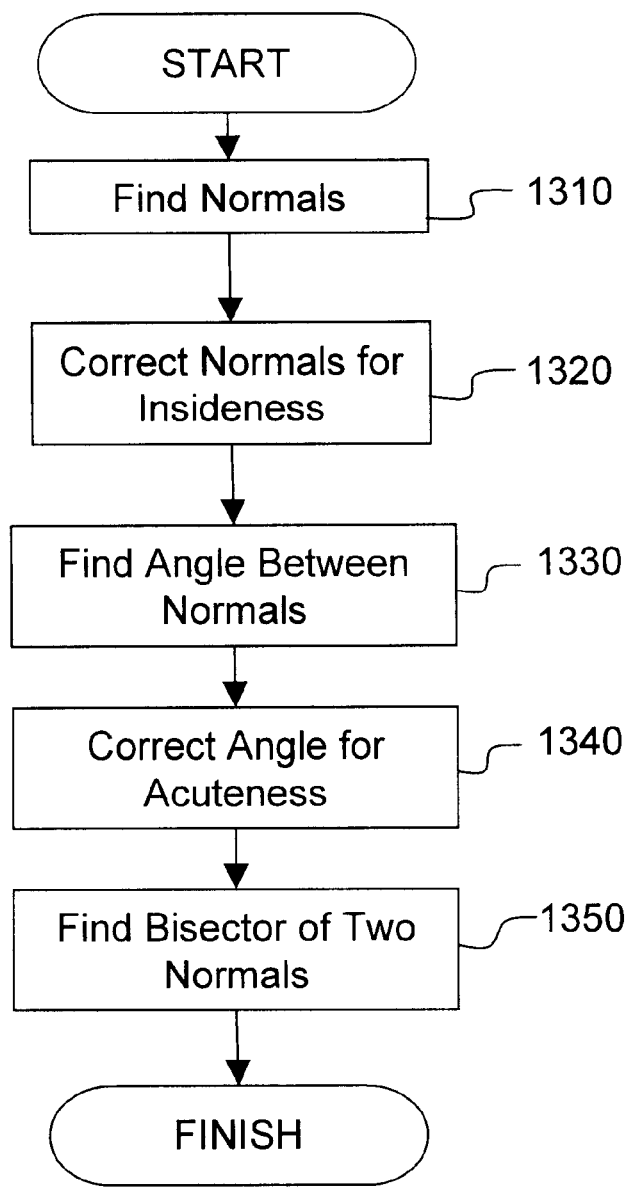
FIG. 13 shows a flowchart for a method of calculating mitre angles, in accordance with an embodiment of the present invention.

Referring to FIGS. 12–13, there is shown a diagram (FIG. 12) and flowchart (FIG. 13) of how, in an embodiment of the present invention, mitre angles are calculated when a partial trap is applied to an object 1210 at an intersection between the object 1210 and a second object 1220. As shown in FIG. 13. the angle is calculated by first, in step 1310, finding normals (1215 and 1225 in FIG. 12) to the local section of the paths of each object. The normals (1215 and 1225) are corrected for insideness (as described above) in step 1320. The angle between the two normals (1235 in FIG. 12) is also found in step 1330, and the angle of the mitre (1230 in FIG. 12) is computed to be the bisector of the angle between the two normals 1215 and 1225. Since two angles are formed between the normals (a first angle and an angle equal to 360 degrees minus the first angle), a measure of the acuteness of the angle between the normals is also found by taking a cross product of a segment of the two normals, and is corrected for acuteness in step 1340. In the last step of the embodiment of the method shown in FIG. 13, step 1350, the bisector of the two normals is found. The method of FIG. 13 is performed for neither, either or both of the ends of the trap, depending on whether the path being trapped intersects the path of another piece of artwork. The use of normals is not necessary to the method of FIG. 13 because a tangent (or some other definite angle) to the path being trapped (corrected for insideness and orientation) could also be used rather than a normal. The diagram shown in FIG. 12 is used for aid in understanding the method of FIG. 13 only, and should not be understood to limit the method of FIG. 13 to a particular geometry with which the method of the present invention may be employed.

Figure 14:
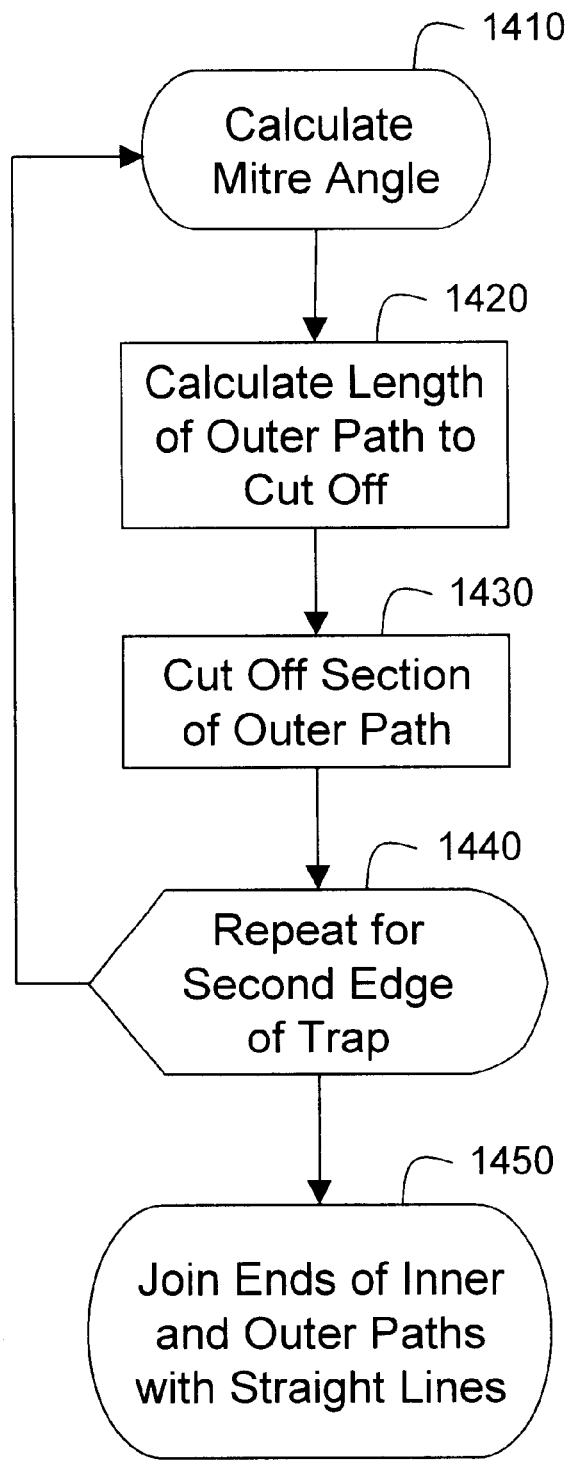
FIG. 14 shows a flowchart for a method of applying mitre edges to traps, in accordance with an embodiment of the present invention.

In accordance with an embodiment of the present invention, after the angle of a mitre has been found, the approximate length of the mitre edge is calculated using trigonometry. An embodiment of the method for calculation a mitre edge is shown in FIG. 14. In step 1410, the method begins with calculation of the mitre angle (in an embodiment, according to the method of FIG. 13). In a second step 1420, the length of the outer path that extends beyond the intersection between the outer path of the trap and a ray cast from the inner path along the mitre angle is calculated, and in step 1430 that length is cut from the end of the outer path. As indicated in step 1440, the steps 1410–1430 of the method are repeated for both ends of the outer path of the trap. Finally, the inner path and the truncated outer path are joined by a straight line in step 1450.

The method described in FIG. 14 is less accurate for curved lines. Thus, in another embodiment of the present invention, a ray is cast from the end of the inner path of a trap at the mitre angle calculated (using the method of FIG. 13), and the point along the ray at a distance from the inner path equal to the width of the trap is found. The outer path of the trap is then truncated from beyond its intersection with this point. The point of intersection is found using winding algorithms for Bezier paths, as described in connection with FIGS. 8–10.

Figure 15:
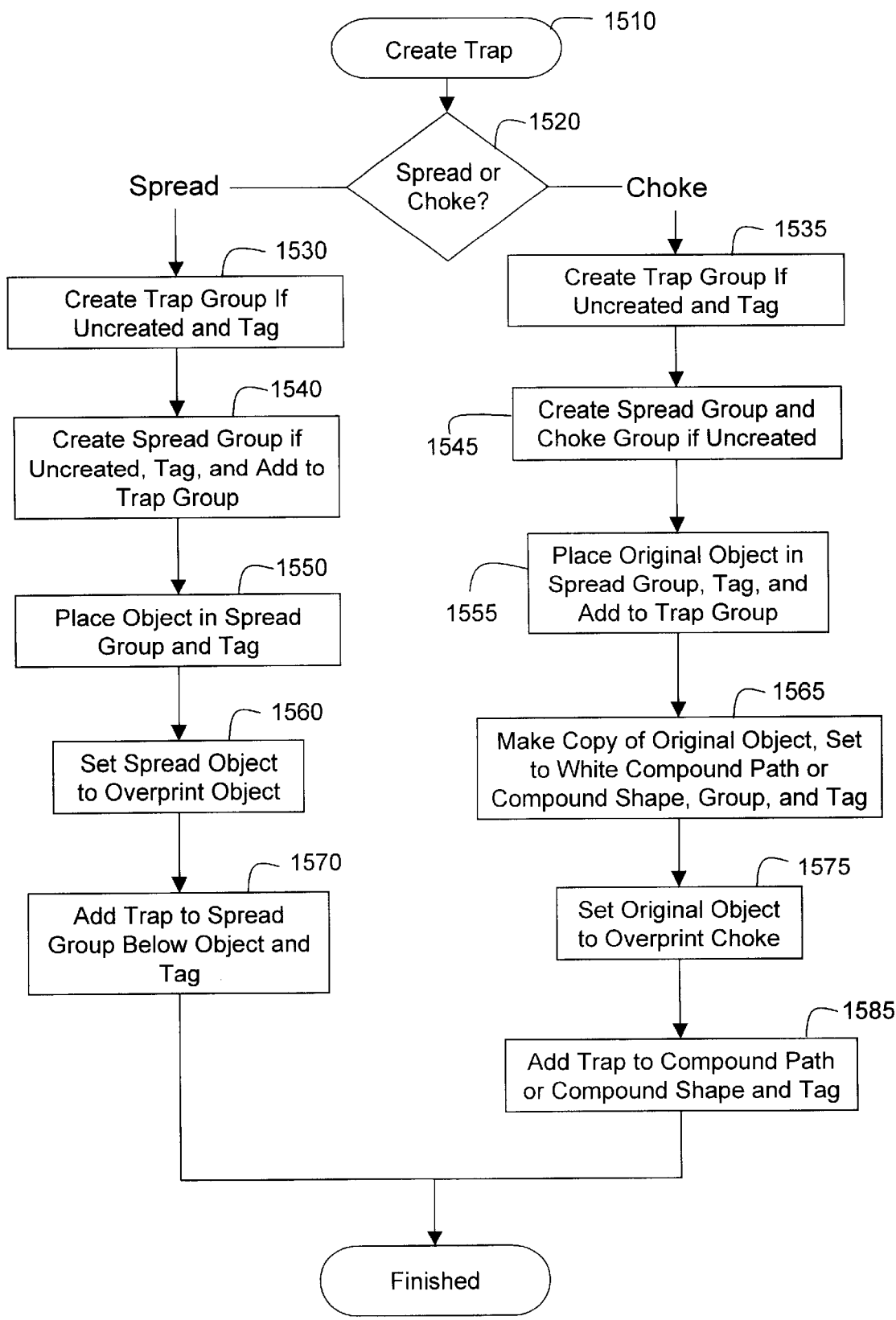
FIG. 15 shows a flowchart overview of how traps are applied in groups, in accordance with an embodiment of the present invention.

FIG. 15 shows a flowchart of the method for applying spreads and chokes to an object within a piece of artwork, in accordance with an embodiment of the present invention. When a trap is created in step 1510, the invention first determines in step 1520 (for example, on the basis of which icon in a toolbox has been activated) whether the trap is a spread or a choke. For both spreads and chokes, a trap group 1610 is created and tagged (in step 1530 for spreads and step 1535 for chokes) unless the trap group 1610 has been created already. In a next step, a spread group 1620 is created for spreads (step 1540), or, for chokes (step 1545). After both a choke group 1650 and a spread group 1620 have been created (in steps 1540 and 1545), the object being trapped is added to the spread group 1620 (in steps 1550 and 1555), and both choke group 1650 and spread group 1620 are added to the trap group 1610, which is labeled with a tag indicating what actions have been completed. FIG. 16 shows the relative placement of the spreads, chokes, spread groups, choke groups, trap groups, objects, and object copies with respect to one another, in accordance with the embodiment of the method shown in FIG. 15.

The embodiment of the method for applying spreads of FIG. 15 continues with step 1550, as the fills of the object being spread are transferred to the spread, and the object itself is added to the spread group (see FIG. 16). In step 1560, the spread is set to overprint the object to which the spread has been applied. If a partial spread is used, a tag identifying the spread as a partial spread is added. The spread is then moved, in step 1570, into the spread group below the object being spread, and the tag is updated. The method for applying spreads is finished after step 1570.

The embodiment of the method for applying chokes shown in FIG. 15 continues, in step 1565, by making a copy of the original object as a compound path or compound shape, with the fill for the artwork removed and replaced with an opaque, plain white fill. Also in step 1565, the copy of the original object 1660 is placed in a choke compound shape, which comprises the choke group 1650 (see FIG. 16), and a tag is added to the trap group indicating what the actions that have been completed. Also. Also in step 1565, the trap group is tagged to reflect that such a copy of the original object has been added. Next, in step 1575, the originally selected object is set to overprint the choke. The compound shape or compound group, in step 1585, is then added to the trap group 1610. A tag identifying the trap as a partial choke may be added in step 1575, (or earlier) as necessary. In an embodiment, the tagging of traps and trap groups allows for the transpose option (described above) to be invoked with a single command, rather than by repeating a sequence of steps. The sequence of steps above is retraced using the tags, and the trap reapplied along the complementary path. (See FIGS. 7A–B.)

For compound paths, the steps of the method shown in FIG. 15 are repeated for each of the subpaths within the compound path. For each subpath, insideness is determined and the path is trapped as described above. In an embodiment, if a partial trap is applied to a compound object that includes some interior area in which a trap might be applied (for example, if a partial trap were applied to the outer oval 8030 of FIG. 8B), a user might be able to apply or remove a trap to the interior area (such as the inner oval 8050 of FIG. 8B) by double clicking on that area after a partial trap had been applied to a path outside of the area. Double clicking again might remove the trap to the interior area.

An additional advantage of the present invention is that substantially the same advantages of efficiency and accuracy gained in applying traps can be employed in the removing traps. In an embodiment, this is accomplished by moving the original artwork out of a trap group, deleting the trap group, restoring the original overprint characteristics of an object, and removing all trapping tags that had been applied to the object. In an embodiment, the remove traps function works for either selected graphic objects or for all objects in a document.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of applying a trap to an object having a geometry in a native artwork production environment, the method comprising the steps of:
   determining a property of insideness for at least one point near the object by casting a ray at an angle to the object;
   modifying the geometry of the object consistently with the property of insideness in order to produce the trap within the native artwork production environment; and
   applying the trap to the object in a specific position with respect to the object.

2. The method of claim 1, wherein the trap is a spread and, in the step of applying the trap to the object, the specific position of the spread is over the object.

3. The method of claim 2, wherein the spread is applied to the entire object.

4. The method of claim 2, wherein the spread is a partial spread applied only to a portion of the object.

5. The method of claim 4, further comprising the step of: transposing the partial spread.

6. The method of claim 1, wherein the trap is a choke and, in the step of applying the trap to the object, the specific position of the choke is under the object.

7. The method of claim 6, wherein the choke is applied to the entire object.

8. The method of claim 6, wherein the choke is a partial choke applied only to a portion of the object.

9. The method of claim 8, further comprising the step of: transposing the partial choke.

10. The method of claim 1, wherein, in the step of modifying the geometry of the object, the geometry is nondestructively modified in accordance with user specified criteria.

11. The method of claim 10, wherein the user specified criteria include trap width.

12. The method of claim 10, wherein the user specified criteria include mitering information.

13. The method of claim 12, wherein the mitering information includes information about mitre angles and mitre joins.

14. The method of claim 13, wherein the user specified criteria include a mitre limit.

15. The method of claim 10, wherein the user specified criteria include information about how the trap is to be filled.

16. The method of claim 1, wherein the object itself includes at least one additional object.

17. The method of claim 1, wherein the steps of the method are implemented as a plug-in tool for a native artwork production environment.

18. A method of applying a trap to an object having a geometry in a native artwork production environment, the method comprising the steps of:
   determining a property of insideness for at least one point near the object by casting a ray at an angle to the object;
   nondestructively modifying the geometry of the object in order to produce the trap within the native artwork production environment, the trap being produced consistently with the property of insideness and user specified criteria, including
   trap width, and
   mitering information; and
   applying the trap to the object in a specific position with respect to the object.

19. The method of claim 18, wherein the trap is a spread and, in the step of applying the trap to the object, the specific position of the spread is over the object.

20. The method of claim 19, wherein the spread is applied to the entire object.

21. The method of claim 19, wherein the spread is a partial spread applied only to a portion of the object.

22. The method of claim 21, further comprising the step of:
   transposing the partial spread.

23. The method of claim 18, wherein the trap is a choke and, in the step of applying the trap to the object, the specific position of the choke is under the object.

24. The method of claim 23, wherein the choke is applied to the entire object.

25. The method of claim 23, wherein the choke is a partial choke applied only to a portion of the object.

26. The method of claim 25, further comprising the step of:
   transposing the partial choke.

27. The method of claim 18, wherein the mitering information includes information about mitre angles and mitre joins.

28. The method of claim 18, wherein the user specified criteria include a mitre limit.

29. The method of claim 18, wherein the user specified criteria include information about how the trap is to be filled.

30. The method of claim 18, wherein the object itself includes at least one additional object.

31. The method of claim 18, wherein the steps of the method are implemented as a plug-in tool for a native artwork production environment.

32. A system for applying a trap to an object having a geometry in a native artwork production environment, the system comprising:
   means for determining a property of insideness for at least one point near the object by casting a ray at an angle to the object;
   means for modifying the geometry of the object consistently with the property of insideness in order to produce the trap within the native artwork production environment; and
   means for applying the trap to the object in a specific position with respect to the object.

33. The system of claim 32, wherein the trap is a spread and the means for applying the trap to the object sets the spread to overprint the object.

34. The system of claim 33, wherein the spread is applied to the entire object.

35. The system of claim 33, wherein the spread is a partial spread applied only to a portion of the object.

36. The system of claim 35, further comprising:
   means for transposing the partial spread.

37. The system of claim 32, wherein the trap is a choke and the means for applying the trap to the object sets the object to overprint the choke.

38. The system of claim 37, wherein the choke is applied to the entire object.

39. The system of claim 37, wherein the choke is a partial choke applied only to a portion of the object.

40. The system of claim 39, further comprising:
   means for transposing the partial choke.

41. The system of claim 32, wherein the means for modifying the geometry of the object changes the geometry of the object consistently with user specified criteria.

42. The system of claim 41, wherein the user specified criteria include trap width.

43. The system of claim 41, wherein the user specified criteria include mitering information.

44. The system of claim 43, wherein the mitering information includes information about mitre angles and mitre joins.

45. The system of claim 44, wherein the user specified criteria include a mitre limit.

46. The system of claim 41, wherein the user specified criteria include information about how the trap is to be filled.

47. The system of claim 32, wherein the object itself includes at least one additional object.

48. The system of claim 32, wherein the steps of the method are implemented as a plug-in tool for a native artwork production environment.

49. A digital artwork trapping system for use in a native artwork production environment, the system comprising:
   at least one software tool for nondestructively applying a spread to at least a part of an object;
   at least one software tool for nondestructively applying a choke to at least a part of an object;
   wherein the at least one software tool for nondestructively applying a spread and the at least one software tool for nondestructively applying a choke are used in accordance with user specified criteria; and
   wherein the digital artwork trapping system operates continuously within a native artwork production environment.

50. The digital artwork trapping system of claim 49, wherein the at least one software tool for nondestructively applying a spread to at least a part of an object includes a spread part tool for nondestructively applying a spread to a part of an object and a spread all tool for nondestructively applying a spread to an entire object.

51. The digital artwork trapping system of claim 50, further comprising:
   a transpose function for transposing a spread applied using the spread part tool.

52. The digital artwork trapping system of claim 49, wherein the at least one software tool for nondestructively applying a choke to at least a part of an object includes a choke part tool for nondestructively applying a choke to a part of an object and a choke all tool for nondestructively applying a choke to an entire object.

53. The digital artwork trapping system of claim 52, further comprising:
   a transpose function for transposing a choke previously applied using the choke part tool.

54. The digital artwork trapping system of claim 49, wherein the user specified criteria include a trap width.

55. The digital artwork trapping system of claim 54, wherein the user specified criteria include mitering information.

56. The digital artwork trapping system of claim 55, wherein the mitering information includes information about mitre angles and mitre joins.

57. The digital artwork trapping system of claim 56, wherein the user specified criteria include a mitre limit.

58. The digital artwork trapping system of claim 49, wherein the user specified criteria include information about how the trap is to be filled.

59. The digital artwork trapping system of claim 49, wherein the object itself includes at least one additional object.

60. The digital artwork trapping system of claim 49, wherein the at least one software tool for nondestructively applying a spread to at least part of an object and the at least one software tool for nondestructively applying a choke to at least part of an object are applied after determining an insideness property for the object using a winding algorithm.

61. The digital artwork trapping system of claim 49, wherein the at least one software tool for nondestructively applying a spread to at least a part of an object, and the at least one software tool for nondestructively applying a choke to at least a part of an object are activated with at least one hotkey.

62. The digital artwork trapping system of claim 49, wherein the native artwork production environment is Adobe Illustrator™.

* * * * *